No. 697,885. Patented Apr. 15, 1902.
H. W. QUADE.
CHEESE BOX TRIMMER.
(Application filed Aug. 10, 1901.)
(No Model.)
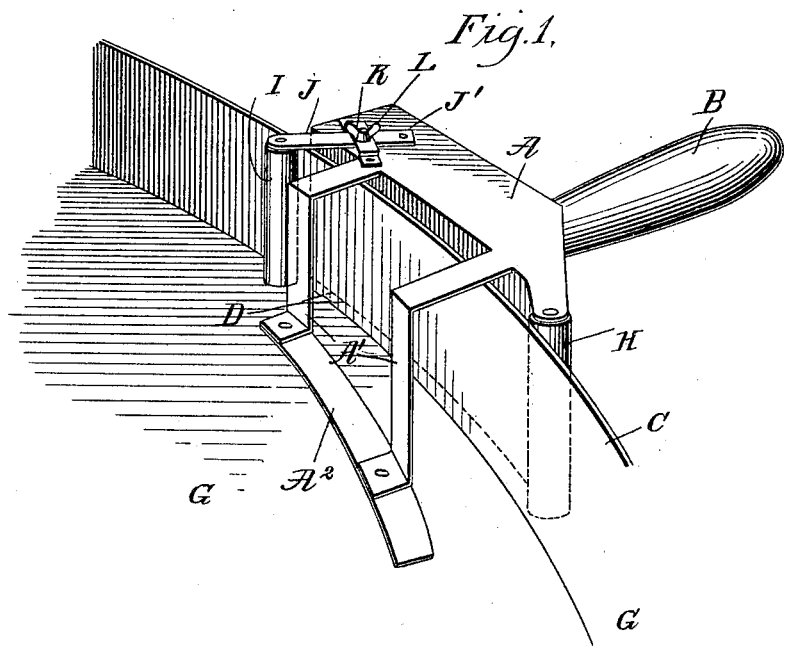
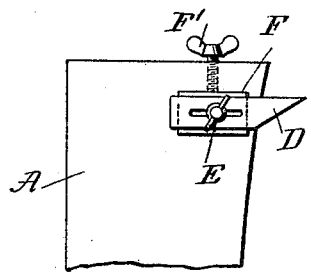
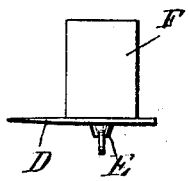
WITNESSES:
Edward Thorpe
INVENTOR
Henry W. Quade
BY
ATTORNEYS

UNITED STATES PATENT OFFICE.

HENRY WILLIAM QUADE, OF WATERTOWN, WISCONSIN.

CHEESE-BOX TRIMMER.

SPECIFICATION forming part of Letters Patent No. 697,885, dated April 15, 1902.

Application filed August 10, 1901. Serial No. 71,624. (No model.)

*To all whom it may concern:*

Be it known that I, HENRY WILLIAM QUADE, a citizen of the United States, and a resident of Watertown, in the county of Jefferson and State of Wisconsin, have invented a new and Improved Cheese-Box Trimmer, of which the following is a full, clear, and exact description.

The object of the invention is to provide a new and improved cheese-box trimmer which is simple and durable in construction, readily applied and manipulated, easily adjustable for boxes of different diameters, and arranged to quickly and accurately reduce the height of the side of the box to the level of the cheese in the box or a little lower to allow for shrinkage of the cheese.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement as applied. Fig. 2 is an inverted plan view of the cutter and the means for adjusting it on the frame, and Fig. 3 is a side elevation of the cutter and its block.

The improved cheese-box trimmer is mounted on a frame A, provided on its outside with a handle B, adapted to be taken hold of by the operator for conveniently moving the frame along outside of the rim C of the cheese-box to reduce the height of the rim down to the top of the cheese or a little below to allow for shrinkage of the cheese. On the under side of the frame A and projecting inwardly is arranged a cutter D for cutting the rim C to the desired height, said cutter being adjustably secured by a clamping-screw E on a block F, held vertically adjustable in the frame A and adapted to be fastened by a set-screw F', as is plainly illustrated in Fig. 2. By this arrangement the cutter D can be adjusted transversely relatively to the frame A and the cheese-box, and by adjusting the block F, carrying the knife or cutter up or down, the rim C can be reduced to the desired height.

From the frame A extend transversely and inwardly L-shaped arms A', carrying a bearing-plate $A^2$, adapted to travel on the top of the cheese G, contained in the box. On the forward end of the frame A is journaled a vertically-disposed roller H, adapted to engage the outside of the rim C, and a similar roller I, journaled on an arm J, is arranged to engage the inside of said rim, said arm J being fulcrumed at J' on the rear end of the frame A, and said arm extends through a yoke K, secured on the frame A, and carrying a clamping-screw L for securing the arm J in place after the same has been adjusted to bring the roller I in firm contact with the under side of the rim C after the roller H has engaged the outside thereof.

By the arrangement described the cheese-box trimmer can be readily adjusted for boxes of different diameters—that is, for large boxes the arm J is swung farther outward and then fastened in place by the clamping-screw L, and for smaller boxes the arm J is swung inward and then secured in place.

In using the device the operator places the frame A in the position shown in Fig. 1, the cutter D being pushed through the rim C in a transverse direction, and by the operator drawing the handle B forward the bearing-plate $A^2$ travels on the cheese and the rollers H and I travel on the faces of the rim C, so that the cutter D now cuts the rim of the box to the level of the cheese or a little below the same to allow for shrinkage of the cheese, it being understood that for the purpose mentioned the block F is adjusted vertically in the frame A the desired distance to bring the cutter D to the proper position.

It is understood that the rim of the cheese-box is trimmed down so as to allow of bringing the cover close down to the top of the cheese to hold the cheese from movement in the box during transportation.

Having thus fully described my invention, I claim as new and desire to secure by Letters Patent—

1. A cheese-box trimmer, comprising a handled frame having an overhanging bearing-plate adapted to rest and travel on a cheese, a cutter secured on the frame, and rollers journaled in the ends of the frame, one of the rollers being adapted to engage the outer face of the cheese-box rim, and the other roller being adapted to engage the inner face thereof, as set forth.

2. A cheese-box trimmer, comprising a handled frame having an overhanging bearing-plate adapted to rest on a cheese, rollers for engaging the cheese-box rim at opposite faces, a block vertically adjustable in said frame, and a cutter extending transversely and secured to said block, as set forth.

3. A cheese-box trimmer, comprising a handled frame having an overhanging bearing-plate adapted to rest on a cheese, rollers for engaging the cheese-box rim at opposite faces, a block vertically adjustable in said frame, and a cutter held transversely adjustable on said block, as set forth.

4. A cheese-box trimmer, comprising a frame, a bearing-plate secured thereon and adapted to rest on a cheese, a cutter carried by the frame, a roller for engaging the roller journaled on one end of the frame, and arranged to engage the outside of the cheese-box rim, a second roller for engaging the inner face of the cheese-box rim, and means adjustable on said frame and in which said second roller is journaled, as set forth.

In testimony whereof I have signed my name to this specification in the presence of two subscribing witnesses.

HENRY WILLIAM QUADE.

Witnesses:
A. TANCK,
EMIL TANCK.